US012335673B2

(12) United States Patent
Westcott et al.

(10) Patent No.: US 12,335,673 B2
(45) Date of Patent: Jun. 17, 2025

(54) PIVOTABLE SPEAKER WITH COMPRESSIBLE RING

(71) Applicant: Polk Audio, LLC, Carlsbad, CA (US)

(72) Inventors: Mark Westcott, Battle Ground, WA (US); Michael L. Strange, Salem, MA (US); Kurt Solland, Goodyear, AZ (US)

(73) Assignee: POLK AUDIO, LLC, Carlsbad, CA (US)

( * ) Notice: Subject to any disclaimer, the term of this patent is extended or adjusted under 35 U.S.C. 154(b) by 149 days.

(21) Appl. No.: 17/936,005

(22) Filed: Sep. 28, 2022

(65) Prior Publication Data

US 2024/0107210 A1 Mar. 28, 2024

(51) Int. Cl.
*H04R 1/02* (2006.01)
*H04R 1/32* (2006.01)

(52) U.S. Cl.
CPC ............. *H04R 1/025* (2013.01); *H04R 1/323* (2013.01)

(58) Field of Classification Search
CPC .......... H04R 1/025; H04R 9/06; H04R 1/026; H04R 1/02; H04R 1/1058; H04R 2201/021; H04R 2201/025
USPC ................................. 381/386, 152, 322, 433
See application file for complete search history.

(56) References Cited

U.S. PATENT DOCUMENTS

| | | | | | |
|---|---|---|---|---|---|
| 6,101,262 | A | 8/2000 | Haase et al. | | |
| 7,178,628 | B2 | 2/2007 | Gordon | | |
| 8,437,495 | B2 | 5/2013 | Wright et al. | | |
| 10,264,338 | B2 | 4/2019 | Humphreys | | |
| 2005/0224281 | A1* | 10/2005 | Gordon | H04R 1/025 | 181/160 |
| 2015/0036858 | A1* | 2/2015 | Aboabdo | H04R 1/02 | 381/334 |
| 2015/0139454 | A1* | 5/2015 | Chen | H04R 1/025 | 381/160 |
| 2017/0171663 | A1* | 6/2017 | Calmel | H04R 9/043 | |

* cited by examiner

*Primary Examiner* — Norman Yu
(74) *Attorney, Agent, or Firm* — Nieves IP Law Group, LLC; Peter A. Nieves

(57) ABSTRACT

The present disclosure relates to a speaker assembly (100) comprising a driver (120), a clamp (105), a retainer (118) and a compressible ring (116). The clamp (105) comprises a cavity (226) in which the driver (120) is located. The retainer (118) is configured to compress the compressible ring (116) against the clamp (105) at a pre-determined compression such that the driver (120) is manually pivotable within the cavity (226). The present disclosure also relates to a method (900) of manufacturing a speaker assembly (100).

18 Claims, 11 Drawing Sheets

PIVOTABLE SPEAKER WITH COMPRESSIBLE RING

TECHNICAL FIELD

The present disclosure concerns speaker assemblies. More particularly, but not exclusively, the present disclosure concerns a pivoting speaker assembly comprising a compressible ring.

DESCRIPTION OF THE RELATED TECHNOLOGY

There is a need for speakers such as wall mounted or ceiling mounted speakers to have pivotable or tiltable drivers, so that sound they produce can be directed towards a desired location.

Speakers that provide a user with the ability to tilt or pivot a driver within a casing of the speaker are known in the prior art. Speaker assemblies are known that allow a driver to slide along a track within a speaker casing so that the position of the driver can be changed by the user. Speaker assemblies are known that hold the driver in a socket and allow the driver to be rotated within the socket by keeping it in tension through the use of a plurality of deformable elements such as springs. These pivoting speaker mechanisms can be complex and costly to make and assemble.

There is therefore a need for improved pivoting speaker assemblies, that allow for a driver to be held in tension such that a user can manually pivot the driver while also holding the driver in the orientation desired by the user.

The present disclosure seeks to mitigate the above-mentioned problems. Alternatively or additionally, the present disclosure seeks to provide an improved speaker assembly.

SUMMARY

A first aspect of the present disclosure relates to a speaker assembly comprising a driver, a clamp, a retainer, and a compressible ring, wherein: the clamp comprises a cavity in which the driver is located, and the retainer is configured to compress the compressible ring against the clamp at a pre-determined compression such that the driver is manually pivotable within the cavity.

A second aspect of the present disclosure relates to a method of manufacturing a speaker assembly, wherein the speaker assembly comprises a driver, a clamp, a retainer and a compressible ring, the method comprising: locating the driver within a cavity of the clamp, and attaching the retainer to the clamp such that the compressible ring is compressed between the retainer and the clamp at a pre-determined compression and the driver is manually pivotable within the cavity.

A third aspect of the present disclosure relates to a speaker assembly comprising a driver, a clamp, a bracket, and a single compressible annulus, wherein: the driver is located within the clamp, and the bracket retains the single compressible annulus in a compressed form between the bracket and the clamp such that the driver is manually pivotable within the clamp.

It will of course be appreciated that features described in relation to one aspect of the present disclosure may be incorporated into other aspects of the present disclosure. For example, the method of the present disclosure may incorporate any of the features described with reference to the apparatus of the present disclosure and vice versa.

DETAILED DESCRIPTION OF CERTAIN INVENTIVE EMBODIMENTS

Figure 1:
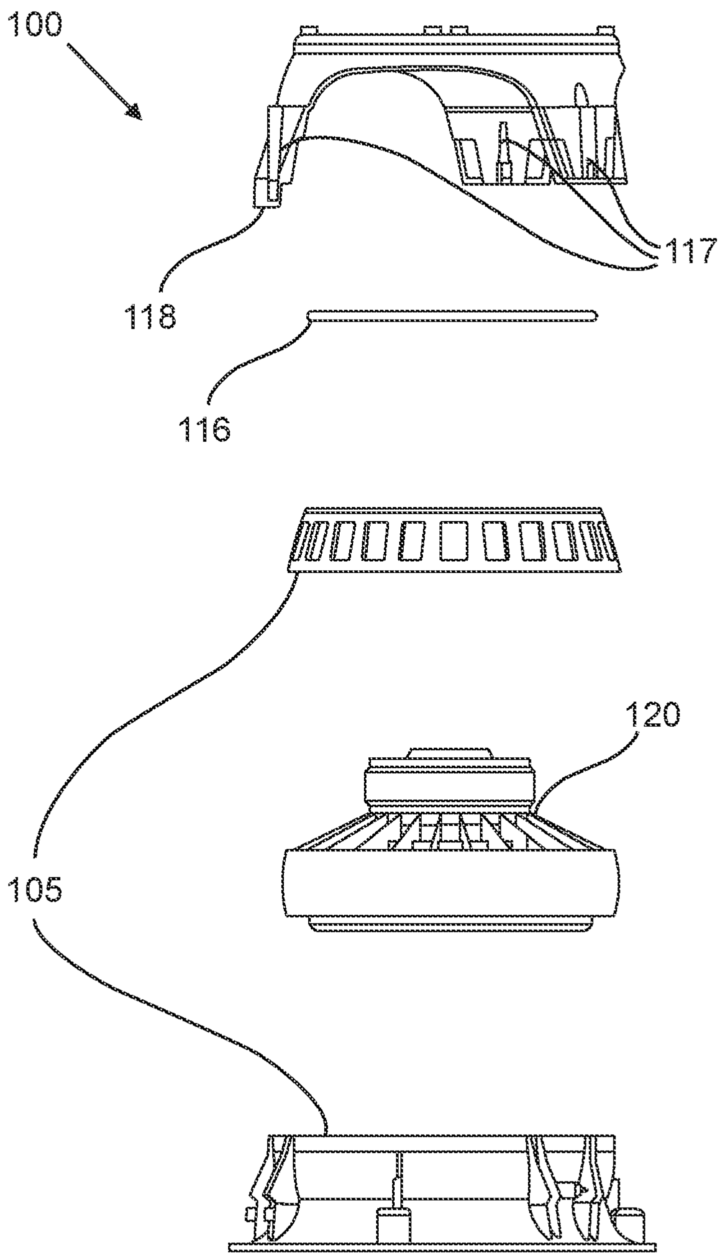
FIG. 1 shows an exploded view of the components of a speaker assembly according to embodiments of the present disclosure.
Figure 2:
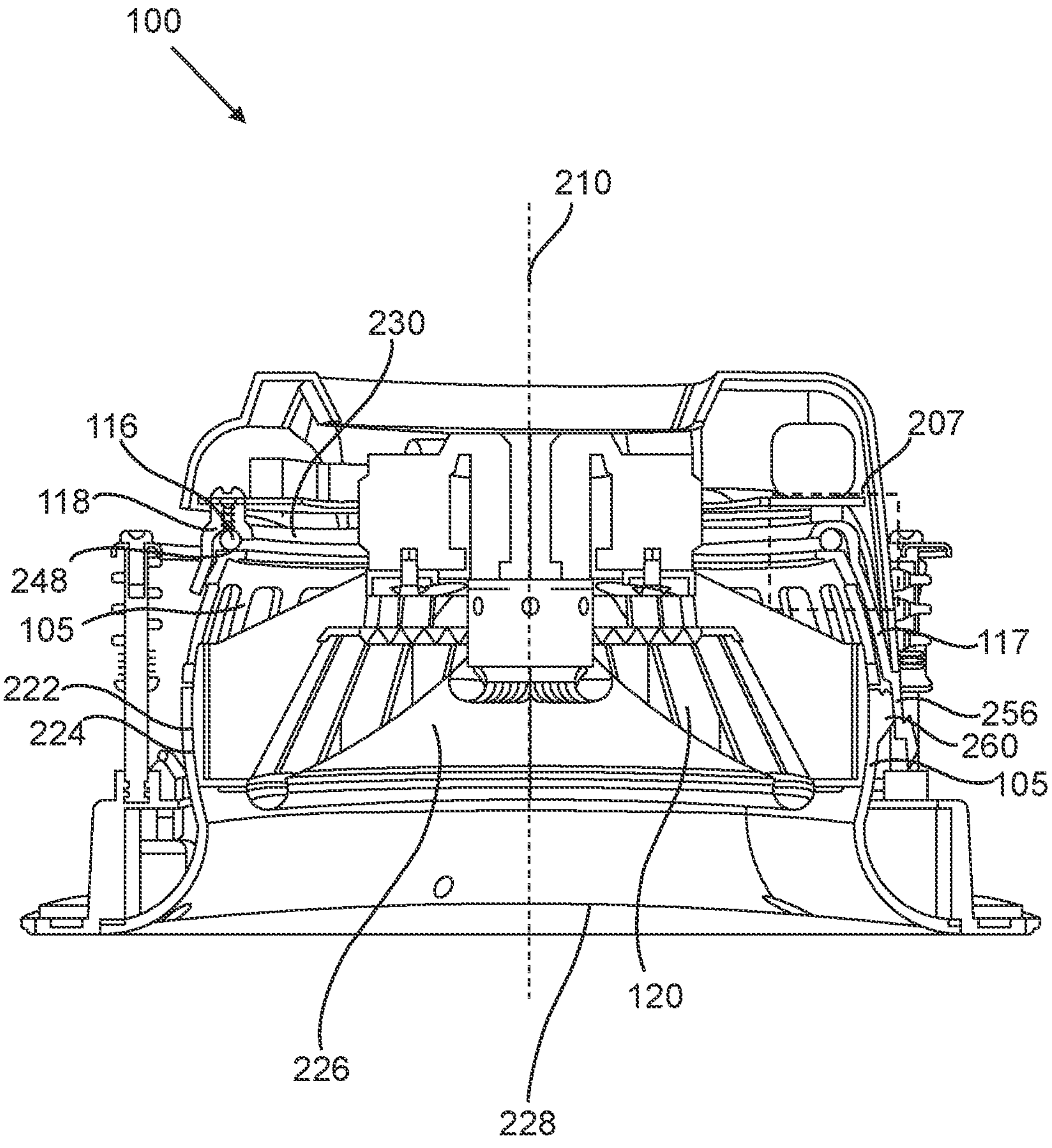
FIG. 2 shows the speaker assembly of FIG. 1 in assembled form from a cross-sectional side view according to embodiments of the present disclosure.
Figure 2A:
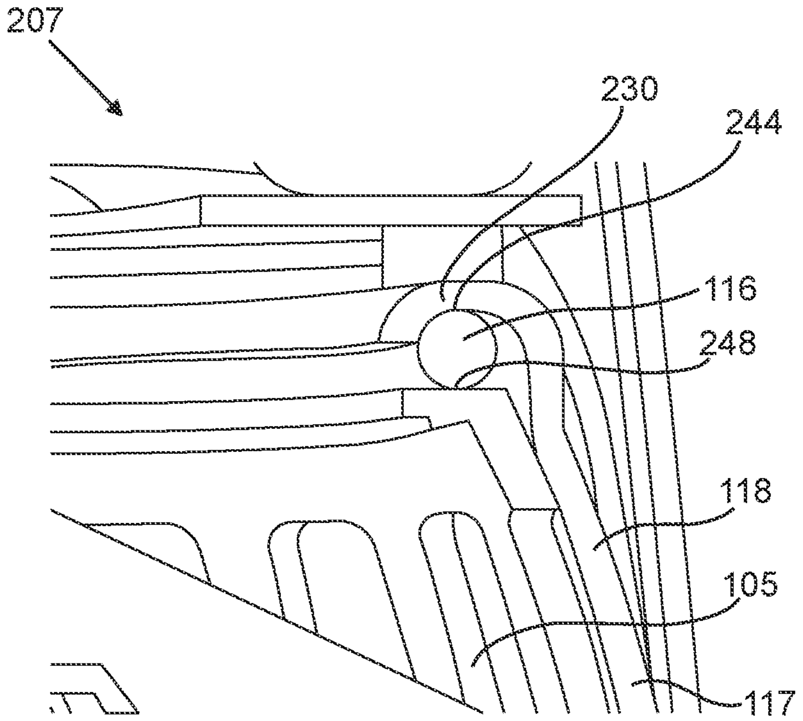
FIG. 2*a* shows a zoomed-in view of a region of FIG. 2.

FIG. 1 shows an exploded view of a speaker assembly 100 according to embodiments of the present invention. FIG. 2 shows speaker assembly 100 of FIG. 1 in assembled form from a cross-sectional side view. FIG. 2*a* shows zoomed-in view of a region 207 of FIG. 2.

Embodiments relate to speaker assembly 100 comprising a driver 120, a clamp 105, a retainer 118 and a compressible ring 116. Clamp 105 comprises a cavity 226 (shown in FIG. 2) in which driver 120 is located. Retainer 118 is configured to compress compressible ring 116 against clamp 105 at a pre-determined compression such that driver 120 is manually pivotable within cavity 226. This helps driver 120 to pivot smoothly within cavity 226 when manually pivoted by a user. Compressible ring 116 deforms when subject to a compressive force, allowing retainer 118 to apply compression to clamp 105. Compression of clamp 105 allows cavity 226 to apply a compressive force to driver 120. Because compressible ring 116 has a generally uniform thickness and compressibility it allows compression force to be applied more evenly to clamp 105, which allows a more even compression force to be exerted on driver 120 within cavity 226. This results in smooth motion of driver 120 when manually pivoted, creating a better user experience.

A central axis 210 of speaker assembly 100 is represented as a dashed line in FIG. 2. Clamp 105 and retainer 118 are arranged such that they are centred on central axis 210. Clamp 105 is arranged around driver 120, such that driver 120 is centred on central axis 210. Clamp 105 defines cavity 226. Driver 120 is located in cavity 226. Speaker assembly 100 has a main opening 228 through which driver 120 is configured to radiate sound. Clamp 105 is shaped to form main opening 228. Main opening 228 is centred on central axis 210 and is circular when viewed in plan view. Main opening 228 is at the "front" of speaker assembly 100 in the direction of central axis 210. The "rear" of speaker assembly 100 is opposite main opening 228 in the direction of central axis 210.

In embodiments, clamp 105 is aligned with compressible ring 116 in the direction of central axis 210. Compressible ring 116 is pressed against a rear facing surface 248 of clamp 105. Rear facing surface 248 is perpendicular to central axis 210. Rear facing surface 248 is annular in shape and centered on central axis 210. Rear facing surface 248 has an inner circumference that is similar to the inner circumference of compressible ring 116. Retainer 118 is aligned with clamp 105 and compressible ring 116 in the direction of central axis 210.

In embodiments, retainer 118 comprises a hook portion 230 that is configured to hook over compressible ring 116 to compress compressible ring 116 against clamp 105 at a pre-determined compression. FIG. 2*a* shows this in detail. This helps to keep compressible ring 116 in position during use. This also helps avoid compressible ring 116 moving/slipping away from retainer 118 during assembly. Further, this helps to promote more uniform deformation of compressible ring 116. Hook portion 230 is located at a rear end of retainer 118. Hook portion 230 protrudes inwards towards central axis 210. Hook portion 230 has a front facing surface 244 which is configured to be pressed against compressible ring 116. Front facing surface 244 of hook portion 230 is configured to curve or wrap around compressible ring 116.

In some embodiments, compressible ring 116 comprises a circular cross section, whereas in other embodiments, compressible ring 116 comprises a non-circular cross section such as a square cross section or an oval cross section. In embodiments, front facing surface 244 of hook portion 230 has a complementary shape that allows hook portion 230 to contact a portion of a perimeter of the cross section of compressible ring 116.

In embodiments, compressible ring 116 comprises an o-ring; in such embodiments, compressible ring 116 has a circular cross section in a plane parallel to central axis 210 when not under compression. In embodiments, front facing surface 244 of hook portion 230 has a complementary shape that allows hook portion 230 to contact a portion of a circumference of the cross section of compressible ring 116.

In embodiments, retainer 118 compresses compressible ring 116 against clamp 105 in the direction of central axis 210. Front facing surface 244 of hook portion 230 presses against compressible ring 116. Compressible ring 116 presses against rear facing surface 248 of clamp 105 in the direction of central axis 210.

In embodiments, hook portion 230 is configured to hook over compressible ring 116 around the entire circumference of compressible ring 116. This allows retainer 118 to provide a more uniform compression around compressible ring 116. This helps reduce non-uniform deformation of compressible ring 116. In alternative embodiments, hook portion 230 is configured to hook over compressible ring 116 for one or more portions of the full circumference of compressible ring 116. The circumference of compressible ring 116 is different to a circumference of a cross section of compressible ring 116.

In embodiments, driver 120 comprises a convex outer surface 222 and cavity 226 of clamp 105 comprises a corresponding concave inner surface 224 such that driver 120 remains in contact with clamp 105 when manually pivoted by a user. This allows concave inner surface 224 of clamp 105 to correspond closely to convex outer surface 222 of driver 120. This in turn helps clamp 105 to provide a more uniform compression to convex outer surface 222 of driver 120. This allows convex outer surface 222 of driver 120 to move smoothly over concave inner surface 224 of clamp 105 when manually pivoted, whilst a compressive force on driver 120 from clamp 105 is maintained. This improves the user experience as it helps driver 120 to pivot smoothly within cavity 226 when manually pivoted.

Concave inner surface 224 faces inwards towards central axis 210. Convex outer surface 222 of driver 120 faces outwards, away from central axis 210. Convex outer surface 222 of driver 120 is in contact with concave inner surface 224 of clamp 105. Therefore, a compression force is applied by concave inner surface 224 to convex outer surface 222 of driver 120.

In embodiments, retainer 118 comprises a plurality of protrusions 117 (as shown most clearly in FIG. 1) which extend in the direction of central axis 210 towards the front of speaker assembly 100. Protrusions 117 are shaped so as to fit over and around clamp 105.

In embodiments, retainer 118 is attached to clamp 105 at a plurality of attachment points 260 on clamp 105. This allows a compressive force between retainer 118 and clamp 105 to be distributed between a number of attachment points 260, allowing more uniform compression of clamp 105. Retainer 118 comprises a plurality of attachment elements 256. Attachment elements 256 are located on protrusions 117 of retainer 118. Attachment elements 256 attach to attachment points 260 to hold the retainer 118 to the clamp 105. In embodiments, attachment elements 256 on retainer 118 are fixed to attachment points 260 on clamp 105 by a snap-fit or other fixing mechanism. In embodiments, retainer 118 comprises three protrusions 117. Each protrusion 117 has an attachment element 256 located on it. Protrusions 117 are located 120 degrees apart around central axis 210 and are configured to line up with three attachment points 260 located 120 degrees apart around central axis 210 on clamp 105.

In embodiments, convex outer surface 222 of driver 120 comprises a truncated sphere and concave inner surface 224 of clamp 105 comprises a truncated sphere. This helps convex outer surface 222 of driver 120 to move smoothly against concave inner surface 224 of clamp 105. This provides an improved user experience as driver 120 can be manually pivoted smoothly within clamp 105. This helps convex outer surface 222 of driver 120 to slide smoothly over concave inner surface 224 of clamp 105 whilst maintaining full contact with it.

In embodiments, driver 120 is manually pivotable about a point (not shown) on central axis 210 which passes centrally through main opening 228 of speaker assembly 100 through which driver 120 is configured to radiate sound.

In embodiments, compressible ring 116 comprises an elastomeric material. Compressible ring 116 therefore deforms when under compression thus allowing a desired compression to be applied by retainer 118.

Figure 3:
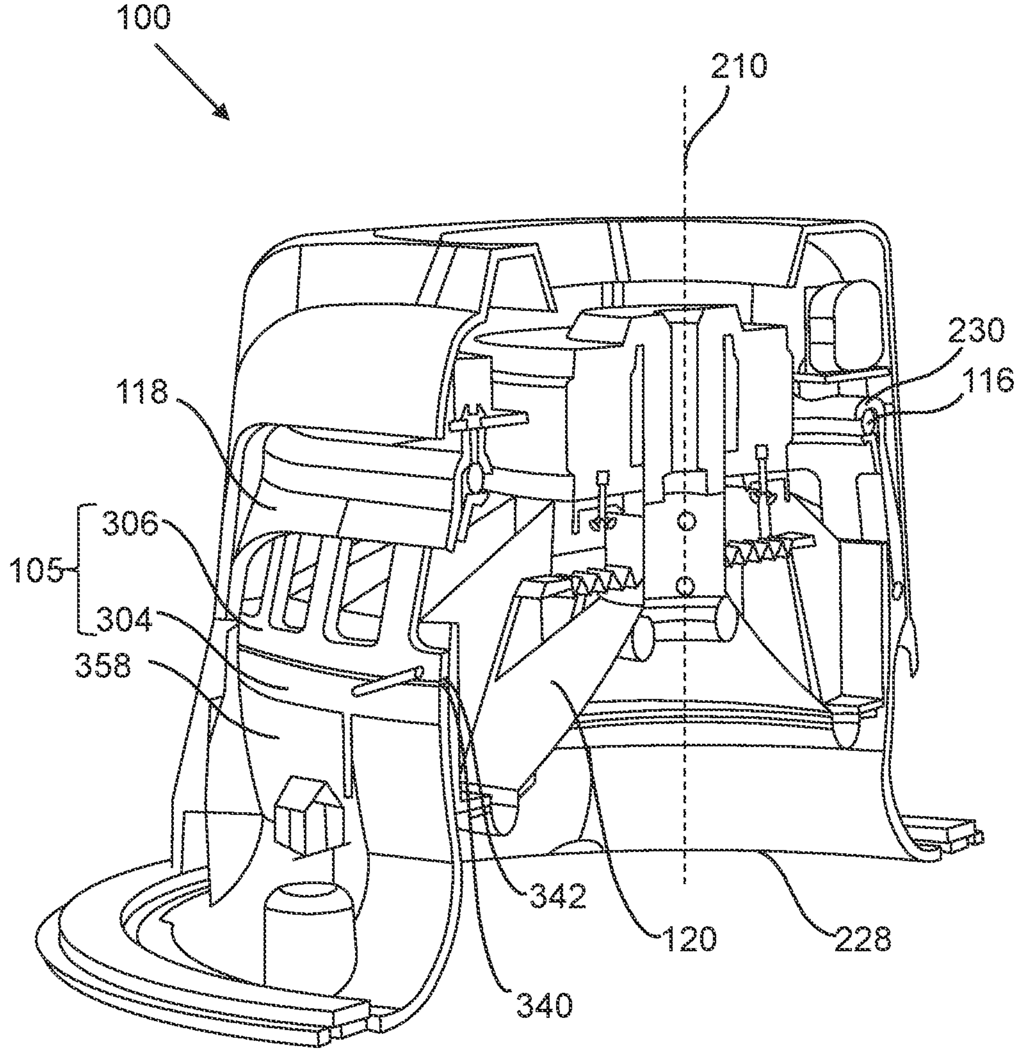
FIG. 3 shows the speaker assembly of FIG. 1 in assembled form from a cross-sectional perspective view according to embodiments of the present disclosure.

FIG. 3 shows speaker assembly 100 in assembled form from a cross-sectional perspective view. In embodiments, clamp 105 comprises a front clamp portion 304 and a rear clamp portion 306. Front clamp portion 304 is located closer than rear clamp portion 306 to main opening 228 of speaker assembly 100 through which driver 120 is configured to radiate sound. Front clamp portion 304 and rear clamp portion 306 together form concave inner surface 224. Retainer 118 compresses front clamp portion 304 and rear clamp portion 306 together around driver 120, allowing front clamp portion 304 and rear clamp portion 306 to grip convex outer surface 222 of driver 120 with concave inner surface 224. Front clamp portion 304 and rear clamp portion 306 can be efficiently assembled around driver 120 during manufacture of speaker assembly 100. In embodiments, front clamp portion 304 and rear clamp portion 306 are aligned in the direction of central axis 210.

In embodiments, during assembly of speaker assembly 100, front clamp portion 304 and rear clamp portion 306 are positioned either side of driver 120 and brought together around driver 120 so that they partially enclose convex outer surface 222. This allows concave inner surface 224 to correspond closely to the shape of convex outer surface 222.

Front clamp portion 304 has a rear facing surface 340 which is perpendicular to central axis 210. Rear clamp portion 306 has a front facing surface 342 which is perpendicular to central axis 210. Rear facing surface 340 is pressed against front facing surface 342. Both front facing surface 342 and rear facing surface 340 are annular and centred on central axis 210.

In embodiments, retainer 118 is attached to front clamp portion 304, and retainer 118 compresses compressible ring 116 against rear clamp portion 306. This allows retainer 118 to hold front clamp portion 304, rear clamp portion 306 and compressible ring 116 together under compression. This allows clamp 105 to provide an appropriate compressive force on either side of driver 120.

In embodiments, retainer 118 is attached to front clamp portion 304 at plurality of attachment points 260. This allows a compressive force between retainer 118 and clamp 105 to be distributed between a number of attachment points, allowing more uniform compression of clamp 105.

In embodiments, clamp 105 has an outer surface 358 that faces outwards from central axis 210. Outer surface 358 is partially covered by retainer 118. Outer surface 358 is convex. Retainer 118 has a shape that compliments outer surface 358, such that retainer 118 wraps closely around outer surface 358.

Figure 4:
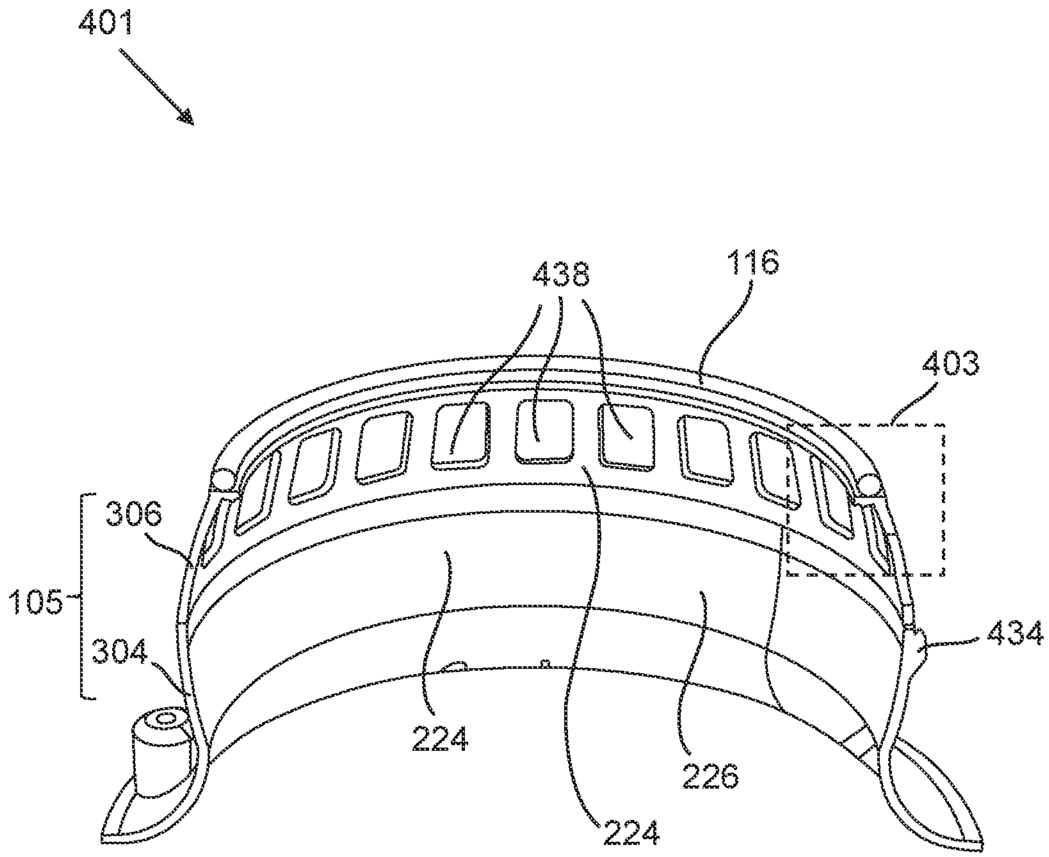
FIG. 4 shows a cross-sectional perspective view of components of the speaker assembly of FIG. 1 according to embodiments of the present disclosure.

FIG. 4 shows a cross-sectional perspective view of components of speaker assembly 100. Components shown in FIG. 4 include clamp 105 and compressible ring 116.

In embodiments, clamp 105 comprises a front shoulder 434 configured for alignment of retainer 118 in relation to clamp 105. Front shoulder 434 allows retainer 118 to be more easily aligned with clamp 105 during assembly, for example by a snap-fit or other fixing mechanism. In embodiments, front shoulder 434 runs around the full circumference of clamp 105 in a plane perpendicular to central axis 210. In embodiments, front shoulder 434 is made up of multiple elements situated at intervals around the circumference of clamp 105. In embodiments, each element of front shoulder 434 comprises an attachment point 260. In embodiments, front shoulder 434 is made up of three elements that are situated 120 degrees apart about the central axis on clamp 105. In embodiments, plurality of attachment points 260 is formed by front shoulder 434; in such embodiments, attachment point 260 is configured to be attached to attachment element 256 of retainer 118 as shown in FIG. 2. In embodiments, front shoulder 434 extends outwards (away from central axis 210) from front clamp portion 304.

In embodiments, rear clamp portion 306 comprises a plurality of perforations 438. Perforations 438 allow air to pass more freely into and out of the region surrounding driver 120, which helps avoid large pressure changes within driver 120 during use. In embodiments, perforations 438 comprise holes or windows in clamp 105. In embodiments, perforations 438 are located towards the rear of clamp 105. In embodiments, perforations 438 comprise square shaped holes in clamp 105. In embodiments, perforations 438 comprise holes in concave inner surface 224 of clamp 105 that extend through to outer surface 358 of clamp 105. In embodiments, perforations 438 are distributed around the circumference of clamp 105. Convex outer surface 222 of driver 120 is able to slide over a region of concave inner surface 224 where perforations 438 are located.

Figure 4A:
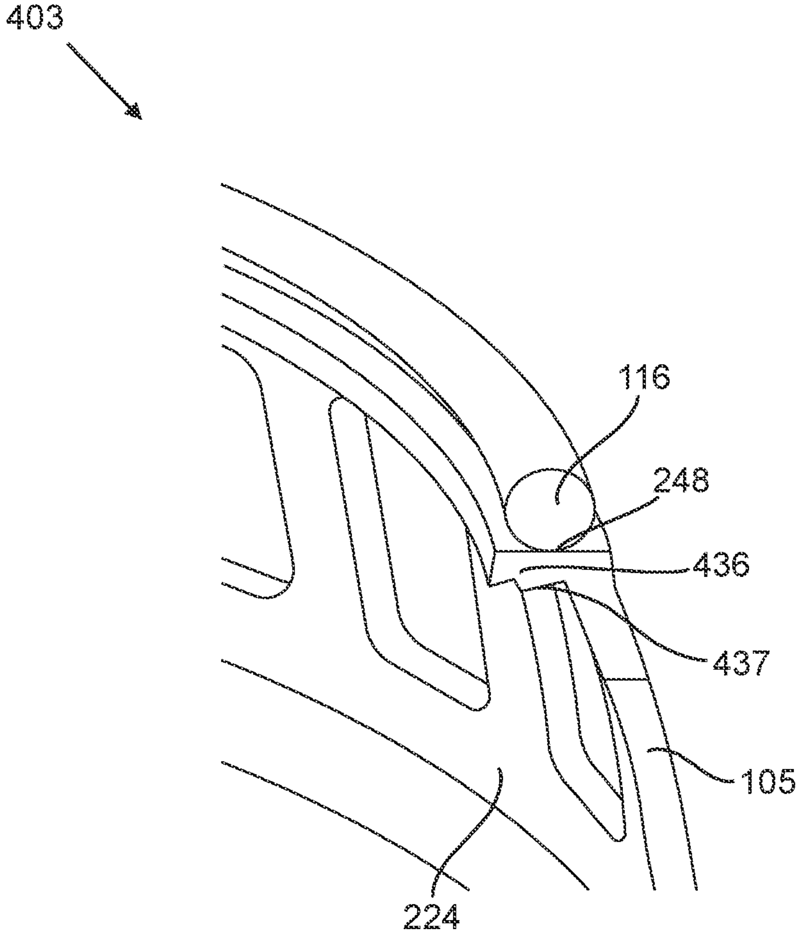
FIG. 4*a* shows a zoomed-in view of a region of FIG. 4.

FIG. 4*a* shows a zoomed-in view of a region 403 of FIG. 4 in greater detail. In embodiments, clamp 105 comprises a rear shoulder 436 configured for prohibiting driver 120 from being manually pivoted beyond a maximum pivot angle. This prevents driver 120 from pivoting further than a certain angle within cavity 226. Having a maximum pivot angle prevents driver 120 from being pivoted to a point where the internal workings of speaker assembly 100 (such as any wiring leading to driver 120) could become damaged or dislodged. This also helps to improve the user experience as the user can easily tell when driver 120 has reached its maximum pivot angle. In embodiments, rear shoulder 436 is located at a rear end of rear clamp portion 306. Rear shoulder 436 extends inwards from clamp 105 towards central axis 210. In embodiments, rear shoulder 436 is an annular protrusion that extends around the entire circumference of clamp 105. In embodiments, rear shoulder 436 forms rear facing surface 248 of clamp 105. Compressible ring 116 presses against rear facing surface 248. Rear shoulder 436 marks the rear edge of concave inner surface 224 of clamp 105. Rear shoulder 436 protrudes towards central axis 210 in a plane that is parallel to central axis 210. In embodiments, rear shoulder 436 has a front facing surface 437 that is generally perpendicular to central axis 210. Front facing surface 437 stops driver 120 from pivoting further than a certain angle within cavity 226.

Figure 4B:
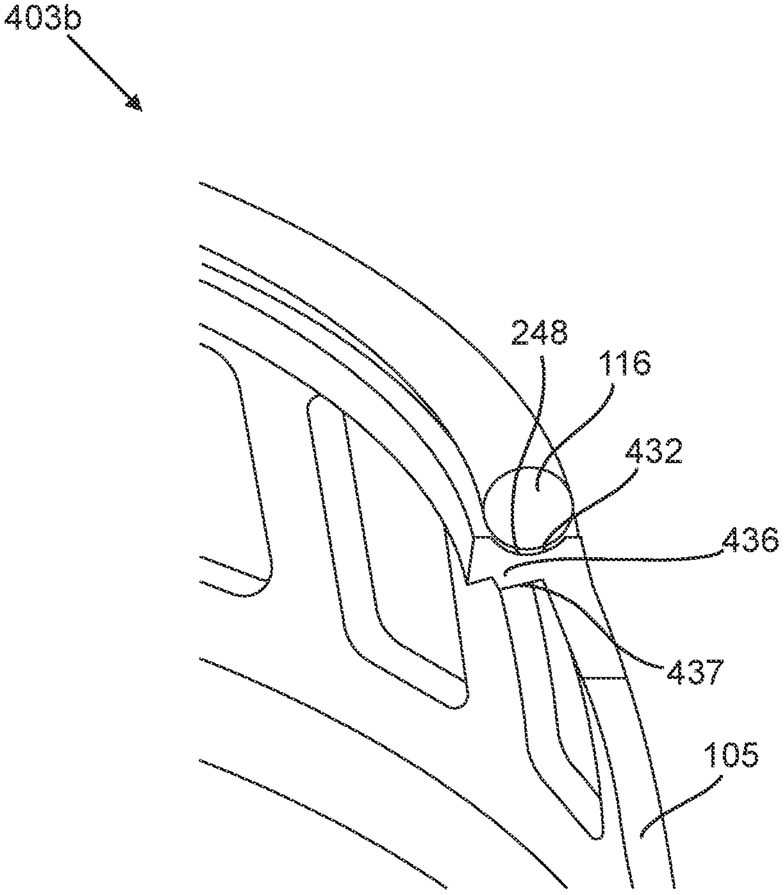
FIG. 4*b* shows a zoomed-in view of a region of FIG. 4 according to an alternative embodiment of the present disclosure.

FIG. 4*b* shows a zoomed-in view of a region 403*b* that is similar to region 403 of FIG. 4, according to an alternative embodiment. In embodiments, clamp 105 comprises an annular groove 432 configured for alignment of compressible ring 116 in relation to clamp 105. Annular groove 432 is located on rear facing surface 248 of clamp 105. Annular groove 432 helps to maintain compressible ring 116 in the correct position in relation to clamp 105. Annular groove 432 helps to locate compressible ring 116 in the correct position during assembly. In embodiments, compressible ring 116 comprises an o-ring and therefore has a circular cross section in a plane parallel to central axis 210. In such embodiments, annular groove 432 comprises a truncated semi-circular cross section in a plane parallel to central axis 210 that is shaped to allow compressible ring 116 to sit in annular groove 432.

In embodiments, compressible ring 116 comprises a rectangular cross section. In embodiments, annular groove 432 comprises a rectangular cross section in a plane parallel to central axis 210 that is shaped to allow compressible ring 116 to sit in annular groove 432.

In embodiments, the cross section of annular groove 432 corresponds to the cross section of compressible ring 116, which helps to keep compressible ring 116 positioned within annular groove 432. Annular groove 432 is centred on central axis 210 and extends in a plane perpendicular to central axis 210. Annular groove 432 is aligned with compressible ring 116 in the direction of central axis 210. In embodiments, annular groove 432 comprises a cross-section in a plane parallel to central axis 210 that allows compressible ring 116 to deform under compression.

Figure 5:
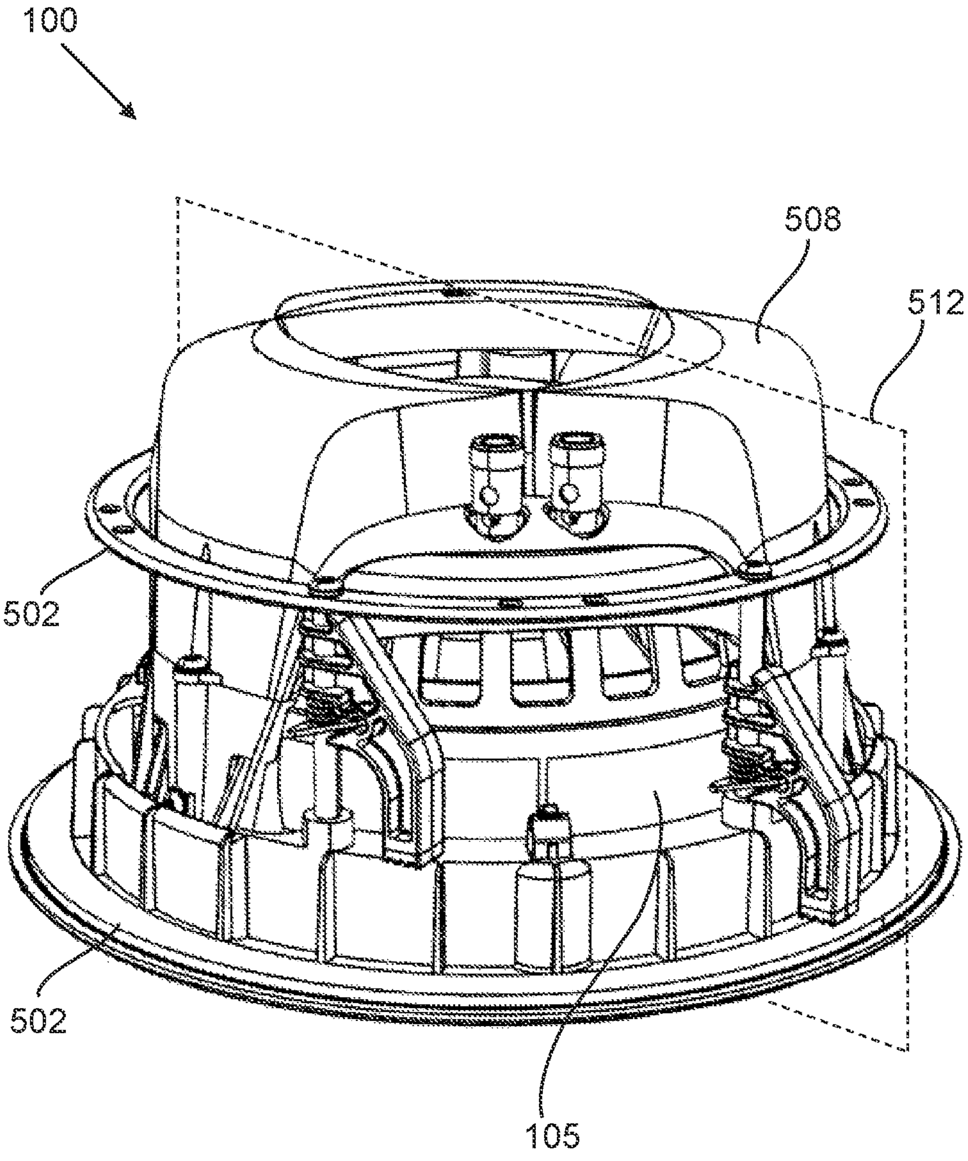
FIG. 5 is a perspective view of the speaker assembly of FIG. 1 in assembled form according to embodiments of the present disclosure.

FIG. 5 shows a perspective view of speaker assembly 100 in assembled form according to embodiments of the present disclosure. Speaker assembly 100 additionally comprises a frame 502 and a cover 508. A plane 512 represents the cross-sectional view of speaker assembly 100 shown in FIG. 2. Cover 508 is positioned at the rear of speaker assembly 100 and wraps around retainer 118. In embodiments, cover 508 is a protective cover that helps to prevent dust and debris from entering cavity 226.

Figure 6:
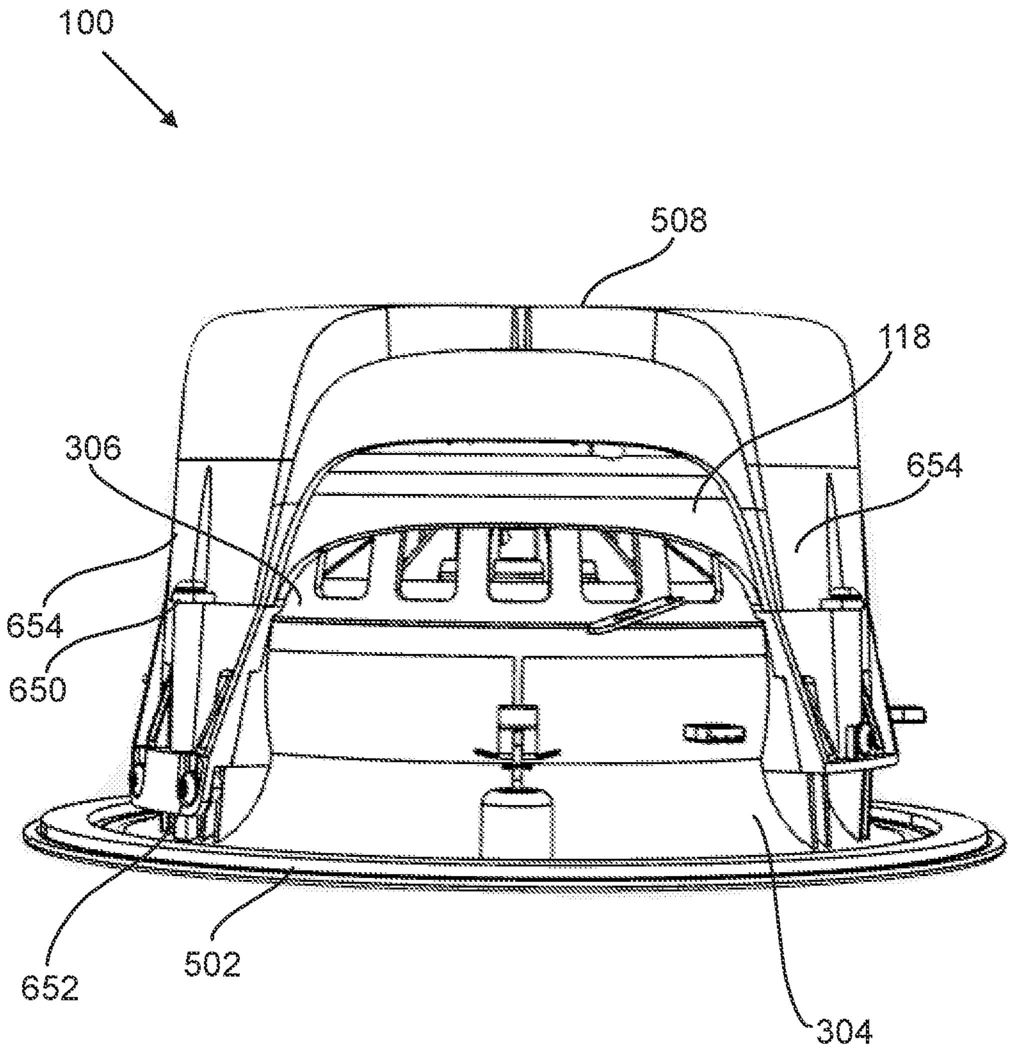
FIG. 6 shows a side view of the speaker assembly of FIG. 1 in assembled form according to embodiments of the present disclosure.

FIG. 6 shows a side view of speaker assembly 100 in assembled form according to embodiments of the present disclosure. Cover 508 shields retainer 118 by wrapping around retainer 118 from the rear of speaker assembly 100. In embodiments, cover 508 has protrusions 654 that correspond to protrusions 117 of retainer 118 (as shown in FIG. 1) and extend towards the front of speaker assembly 100 in the direction of central axis 210. Cover 508 is attached to frame 502 by a plurality of pins 650. Pins 650 are positioned parallel to central axis 210. Cover 508 is attached to retainer 118 by a plurality of side pins 652.

Figure 7:
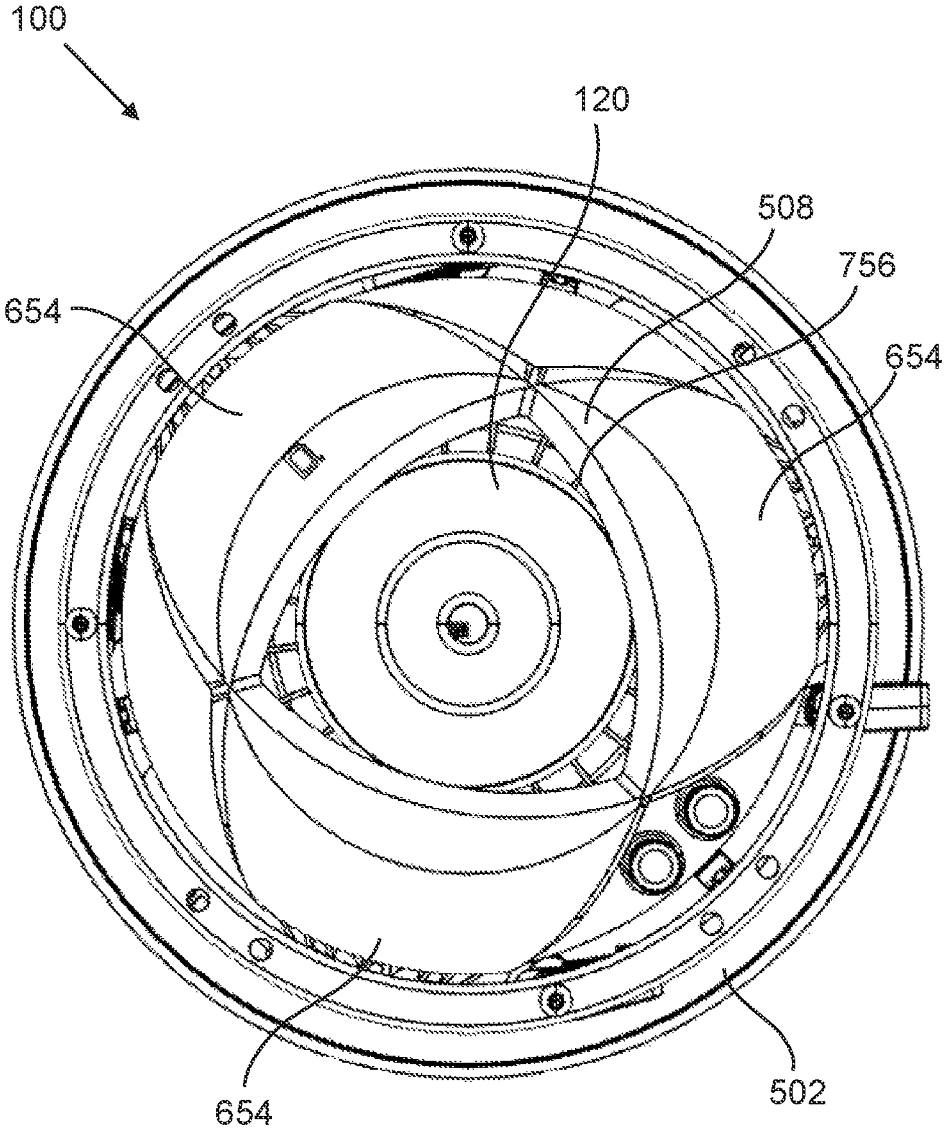
FIG. 7 shows a plan view of the speaker assembly of FIG. 1 in assembled form according to embodiments of the present disclosure.

FIG. 7 shows a plan view of the rear of speaker assembly 100 in assembled form according to embodiments of the present disclosure. Cover 508 forms the rear of speaker assembly 100. In embodiments, cover 508 has three protrusions 654 that are located 120 degrees apart around central axis 210. Retainer 118 is positioned beneath cover 508 and has protrusions 117 that correspond to protrusions 654 of cover 508. Cover 508 has a rear opening 756. Rear opening 756 allows air to pass more freely into and out of cavity 226 in which driver 120 is located. Driver 120 is partially visible in plan view through rear opening 756 and is partially covered by cover 508.

In embodiments, speaker assembly 100 has a circular shape in plan view. Frame 502 is annular in plan view and forms an outer edge of speaker assembly 100. In embodiments, frame 502 is used to mount speaker assembly 100 into a ceiling recess. In embodiments, frame 502 is used to mount speaker assembly 100 into a wall recess.

Figure 8:
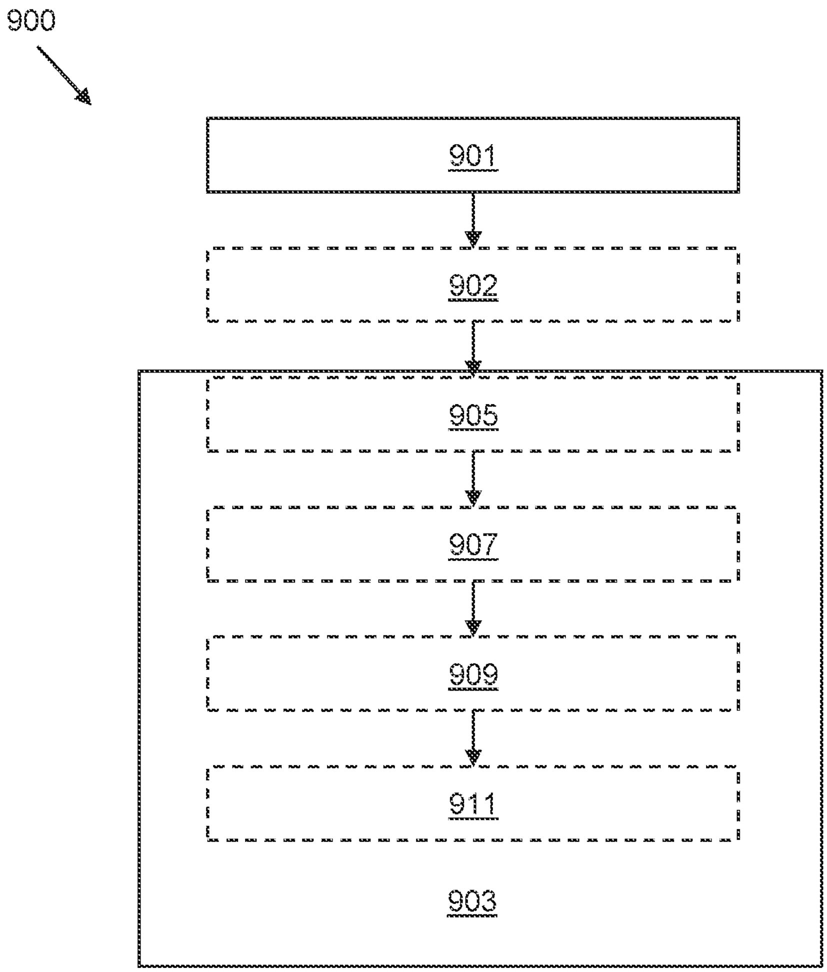
FIG. 8 is a flow chart for methods of manufacture of a speaker assembly according to embodiments of the present disclosure.

FIG. 8 shows a flow chart of a method of manufacturing speaker assembly 100 according to embodiments of the present disclosure. Embodiments comprise a method of manufacturing 900 speaker assembly 100 comprising driver 120, clamp 105, retainer 118 and compressible ring 116. The method comprises locating driver 120 within cavity 226 of clamp 105, step 901. The method also comprises attaching retainer 118 to clamp 105 such that compressible ring 116 is compressed between retainer 118 and clamp 105 at a pre-determined compression and driver 120 is manually pivotable within cavity 226, step 903. In embodiments, clamp 105 comprises front clamp portion 304 and rear clamp portion 306, front clamp portion 304 being located closer than rear clamp portion 306 to main opening 228 of speaker assembly 100 through which driver 120 is configured to radiate sound. In embodiments, attaching retainer 118 to clamp 105, step 903, comprises attaching retainer 118 to front clamp portion 304, step 905, and compressing compressible ring 116 between rear clamp portion 306 and retainer 118, step 907. In embodiments, retainer 118 comprises hook portion 230 and attaching retainer 118 to clamp 105, step 903, comprises hooking hook portion 230 over compressible ring 116, step 909. In embodiments, clamp 105 comprises front shoulder 434. In embodiments, retainer 118 comprises one or more attachment elements 256. In embodiments, attaching retainer 118 to clamp 105, step 903, comprises attaching one or more attachment elements 256 to front shoulder 434 of clamp 105, step 911. In embodiments, clamp 105 comprises annular groove 432. In embodiments, the method comprises, prior to attaching retainer 118 to clamp 105, step 903, aligning compressible ring 116 with annular groove 432 of clamp 105, step 902.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In alternative embodiments, speaker assembly comprises a driver; a clamp; a bracket; and a single compressible annulus. The driver is located within the clamp. The bracket retains the single compressible annulus in a compressed form between the bracket and the clamp such that the driver is manually pivotable within the clamp. Having a single compressible annulus allows the speaker assembly to be more easily manufactured.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

What is claimed is:

1. A speaker assembly comprising:
a driver;
a clamp;
a retainer; and
a compressible ring, wherein:
the clamp comprises a cavity in which the driver is located,
the retainer is configured to compress the compressible ring against the clamp at a pre-determined compression such that the driver is manually pivotable within the cavity, and
wherein the retainer comprises a hook portion that is configured to hook over the compressible ring to compress the compressible ring against the clamp at the pre-determined compression.

2. The speaker assembly of claim 1, wherein the compressible ring comprises an o-ring.

3. The speaker assembly of claim 1, wherein the clamp comprises a front clamp portion and a rear clamp portion, the front clamp portion being located closer than the rear clamp portion to a main opening of the speaker assembly through which the driver is configured to radiate sound.

4. The speaker assembly of claim 3, wherein:
the retainer is attached to the front clamp portion, and
the retainer compresses the compressible ring against the rear clamp portion.

5. The speaker assembly of claim 3, wherein the retainer is attached to the front clamp portion at a plurality of attachment points.

6. The speaker assembly of claim 1, wherein the hook portion is configured to hook over the compressible ring around the entire circumference of the compressible ring.

7. The speaker assembly of claim 1, wherein the clamp comprises an annular groove configured for alignment of the compressible ring in relation to the clamp.

8. The speaker assembly of claim 1, wherein the clamp comprises a front shoulder configured for alignment of the retainer in relation to the clamp.

9. The speaker assembly of claim 1, wherein the clamp comprises a rear shoulder configured for prohibiting the driver from being manually pivoted beyond a maximum pivot angle.

10. The speaker assembly of claim 3, wherein the rear clamp portion comprises a plurality of perforations.

11. The speaker assembly of claim 1, wherein the driver is manually pivotable about a point on a central axis which passes centrally through a main opening of the speaker assembly through which the driver is configured to radiate sound.

12. The speaker assembly of claim 1, wherein the driver comprises a convex outer surface and the cavity of the clamp comprises a corresponding concave inner surface such that the driver remains in contact with the clamp when manually pivoted.

13. The speaker assembly of claim 12, wherein the convex outer surface of the driver comprises a truncated sphere and the concave inner surface of the clamp comprises a truncated sphere.

14. A method of manufacturing a speaker assembly, wherein the speaker assembly comprises:

a driver;

a clamp;

a retainer; and a compressible ring, the method comprising:

locating the driver within a cavity of the clamp; and attaching the retainer to the clamp such that the compressible ring is compressed between the retainer and the clamp at a pre-determined compression and the driver is manually pivotable within the cavity, wherein the retainer comprises a hook portion that is configured to hook over the compressible ring to compress the compressible ring against the clamp at the pre-determined compression.

15. The method of claim 14, wherein:

the clamp comprises a front clamp portion and a rear clamp portion, the front clamp portion being located closer than the rear clamp portion to a main opening of the speaker assembly through which the driver is configured to radiate sound, wherein attaching the retainer to the clamp comprises:

attaching the retainer to the front clamp portion, and compressing the compressible ring between the rear clamp portion and the retainer.

16. The method of claim 14, wherein:

the clamp comprises a front shoulder, the retainer comprises one or more attachment elements, and attaching the retainer to the clamp comprises attaching the one or more attachment elements to the front shoulder of the clamp.

17. The method of claim 14, wherein:

the clamp comprises an annular groove, and the method comprises, prior to attaching the retainer to the clamp, aligning the compressible ring with the annular groove of the clamp.

18. A speaker assembly comprising:

a driver;

a clamp;

a bracket; and a single compressible annulus, wherein:

the driver is located within the clamp, and the bracket retains the single compressible annulus in a compressed form, at a predetermined compression, between the bracket and the clamp such that the driver is manually pivotable within the clamp, wherein the bracket is a retainer and the retainer comprises a hook portion that is configured to hook over the single compressible annulus to compress the compressible annulus against the clamp at the predetermined compression.

* * * * *